United States Patent [19]

Winchester, Jr.

[11] 4,189,327

[45] Feb. 19, 1980

[54] SEMI-CORDIERITE AND METHOD OF MAKING THE SAME

[75] Inventor: George L. Winchester, Jr., Greensboro, N.C.

[73] Assignee: Resco Products, Inc., Norristown, Pa.

[21] Appl. No.: 896,668

[22] Filed: Apr. 17, 1978

[51] Int. Cl.² ............................................ C04B 35/16
[52] U.S. Cl. ...................................... 106/60; 106/62; 106/73.4; 106/73.5
[58] Field of Search ................... 106/60, 62, 73.5, 73.4

[56] References Cited

U.S. PATENT DOCUMENTS 3,885,977  5/1975  Lachman et al. .................. 106/73.5

*Primary Examiner*—James Poer
*Attorney, Agent, or Firm*—Seidel, Gonda, Goldhammer & Panitch

[57] ABSTRACT

A semi-cordierite grog composition is made by forming a mixture comprising about 8 to about 20 weight percent olivine and about 80 to about 92 weight percent of a natural mineral selected from the group consisting of kaolin, bentonite, aluminum silicates, diaspore, quartz and mixtures thereof, wherein the kaolin comprises at least 75 weight percent of the natural mineral, and sintering the mixture at a temperature of about 1330° C. to about 1390° C.

32 Claims, 1 Drawing Figure

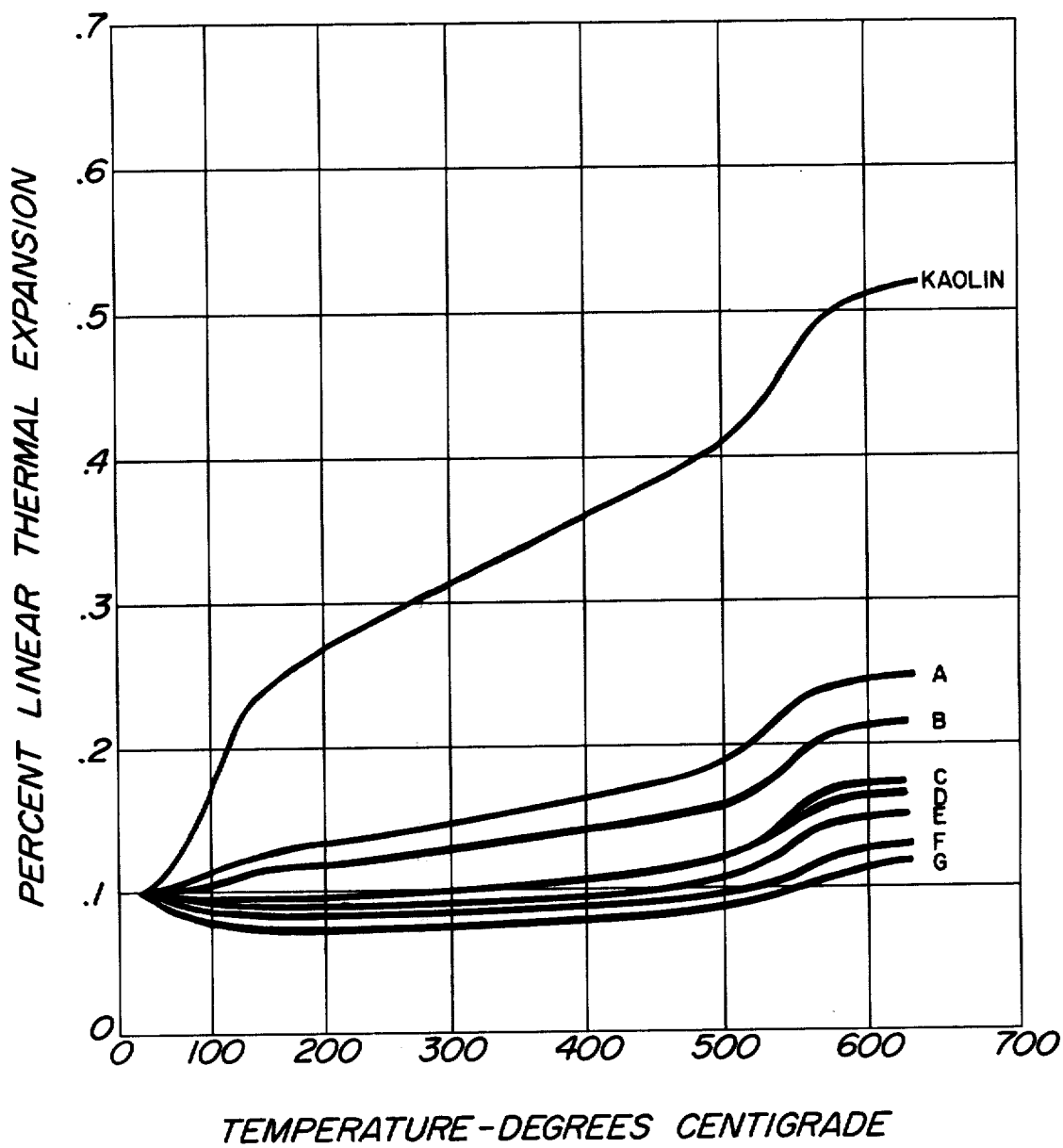

SEMI-CORDIERITE AND METHOD OF MAKING THE SAME

BACKGROUND OF THE INVENTION

This invention relates to a synthetic semi-cordierite grog intended for use in making refractory bodies, such as insulating bricks, kiln cartop blocks, castables, plastic refractories and the like.

Cordierite is a rarely occurring natural magnesium-aluminum-silicate mineral which can impart good thermal shock resistance to refractory bodies containing the cordierite due to its low thermal expansion characteristics. Stoichiometric cordierite has a theoretical formula $2MgO.2Al_2O_3.5SiO$ and a composition of 13.8% MgO, 34.8% $Al_2O_3$ and 51.4% $SiO_2$.

The natural deposits are too impure and scarce to be a valuable commercial source of cordierite. Synthetic cordierites have been produced by sintering mixtures of talc and clay or talc, clay and alumina to form stoichiometric or near stoichiometric cordierite, but complete reaction is difficult without fusing the mass. Synthetic cordierite has also been formed by intimately blending magnesia, alumina and silica in precise proportions and firing to a sintering temperature sufficient to convert these oxides into cordierite. Again, complete reaction is virtually impossible without complete fusing.

Most of the prior art methods used to make cordierite are concerned with producing stoichiometric or near stoichiometric cordierite. Unfortunately, stoichiometric cordierite has a very short firing range, especially where naturally occurring impurities exist. This creates a problem, in that very exact temperature control is necessary to sinter the mixed ingredients to form synthetic stoichiometric cordierite. If the temperature is too low, cordierite will not form; if the temperature is a little too high, it will melt. As can be seen from a standard $MgO$—$Al_2O_3$—$SiO_2$ phase diagram, cordierite lies in the mullite field, indicating its instability. Accordingly, the present methods of making cordierite require very precise control to assure that cordierite will be formed, rather than other magnesia-alumina-silica phases.

Because of the limited firing range of stoichiometric cordierite, synthetic stoichiometric cordierite is often formed by fusing (i.e., forming by melting) magnesia, alumina and silica containing ingredients. Fusion increases the amount of stoichiometric cordierite formed from the oxides, compared to sintering. However, fusion is expensive and is not energy efficient because more energy is required to fuse than to sinter, and because of the inefficiency of radiant energy transfer into a molten mass.

The following patents are believed to represent the closest prior art and disclose methods of making synthetic cordierite or compositions having percentages of magnesia, alumina and silica approximating those of cordierite:

U.S. Pat. No. 2,036,190 of Benner et al. discloses a process of making ceramic articles from certain alumino-silicates by melting or by vitrifying and then devitrifying a mixture of the ingredients comprising the ceramic material. Preferably, the ingredients are prefused. The oxides of magnesium, barium, zinc, calcium and gallium may be present in a composition along with alumina and/or silica. This patent does not teach the formation of a semi-cordierite by sintering olivine with the natural minerals referred to hereinafter.

U.S. Pat. No. 2,731,355 of Skinner discloses a method of making synthetic cordierite using natural minerals as starting materials. A natural magnesium-containing mineral such as olivine, serpentine, talc or brucite, is mixed with aluminous material, such as kaolin, bauxite or siliceous bauxite, and silica, if necessary. The magnesium-containing minerals are mixed and melted to produce a composition corresponding to that of forsterite plus enstatitite. Sufficient iron is included in the melt to increase the specific gravity of any ferrosilicon which may be formed during the melting of the raw materials to facilitate its separation from the molten mass by precipitation. The aluminous material and silica are added to the molten magnesium silicate at a temperature of at least 1475° C. in proportions sufficient to form a magnesium-aluminum-silicate melt having the chemical composition of cordierite. The iron and associated ferro-silicon formed during melting is removed, followed by cooling. A slow cooling process is used to develop large cordierite crystals. The fused batch must be cooled to 800° C. in not less than 8 hours and to room temperature in not less than 4 additional hours. The composition produced by this method contains 10–30% MgO, 15–50% $Al_2O_3$ and 35–70% $SiO_2$.

The patented process is a fusion process, not a sintering process. Moreover, the patented method produces a synthetic cordierite from which substantially all iron is removed. The non-stoichiometric cordierite produced in accordance with the present invention advantageously contains a significant amount of iron.

U.S. Pat. No. 2,864,919 of Stringfellow discloses a ceramic composition containing more than 50% of cordierite crystals having a composition of 5–15% MgO, 22–58% $Al_2O_3$ and 38–63% $SiO_2$. The composition is formed by firing a mixture of talc, kaolin and alumina at temperatures from about 2300° to 2700° F. There is no mention of olivine.

U.S. Pat. No. 3,885,977 of Lachman et al. discloses a method of producing a cordierite having a particular orientation of crystals by orienting the precursor materials in the proper direction during the forming process. This may be done only by selecting raw materials which lend themselves to the orientation process. In particular, raw materials which are in the form of flat, planar (platelet) particles, rather than large isodimensional particles are most useful. The raw materials include high purity clay, talc, silica, alumina, aluminum hydroxides and magnesia-yielding chemicals in amounts so that the final composition comprises 9–20% MgO, 30–50% $Al_2O_3$ and 41–56.3% $SiO_2$. The particularly oriented precursor materials are fired at a temperature of 1340°–1350° C. The present invention is not concerned with the particular orienting process disclosed in this patent.

SUMMARY OF THE INVENTION

The present invention comprises a method of making a semi-cordierite grog composition comprising forming a mixture comprising about 8 to about 20 weight percent olivine and about 80 to about 92 weight percent of a natural mineral selected from the group consisting of kaolin, fireclay, bauxite, bentonite, aluminum silicates such as pyrophyllite, sillimanite, kyanite and andalusite, diaspore, quartz and mixtures thereof, wherein the kaolin comprises at least about 75 weight percent of the natural mineral, and sintering the mixture at a temperature of about 1330° C. to about 1390° C.

Other embodiments of the method include the substitution of from about 1 to about 25 weight percent of hereinafter specified minerals for an equivalent amount of the kaolin in the natural mineral. Thus, the method of the present invention basically comprises the mixing and sintering of at least two naturally occurring minerals to produce the semi-cordierite grog composition.

The composition formed in accordance with the method of the present invention is a non-stoichiometric cordierite containing less MgO than is contained in stoichiometric cordierite. The composition of the present invention also contains a significant amount of FeO. There is no FeO in stoichiometric corderite. The semi-cordierite grog contains about 4.4 to about 10.9 weight percent MgO, about 30.8 to about 35.9 weight percent $Al_2O_3$, about 54.8 to about 56.8 weight percent $SiO_2$ and about 2.0 to about 2.7 weight percent FeO.

BRIEF DESCRIPTION OF DRAWING

The sole FIGURE is a graph of percent linear thermal expansion versus temperature, showing the greatly reduced thermal expansion characteristics of the present invention.

DETAILED DESCRIPTION OF THE PREFERRED EMBODIMENTS

The present invention comprises a non-stoichiometric cordierite grog composition, referred to herein as a semi-cordierite grog composition, wherein ferrous oxide is substituted for part of the magnesia present in stoichiometric cordierite. Grog produced from the composition according to the present invention may be added to any number of various refractory materials to impart high shock resistance and low thermal expansion characteristics associated with cordierite to the refractory materials. The refractories produced using the grog of the present invention may be used for castables, kiln cartops, blocks of any desired shape, and the like.

The semi-cordierite grogs of the present invention are safely produced at temperatures that might melt stoichiometric cordierite compositions. By using less than stoichiometric quantities of MgO, less than critical quantities of liquid are produced in the grog at optimum cordierite forming temperatures without a danger of melting. The semi-cordierite grog produced in accordance with the present invention is more refractory than a stoichiometric cordierite produced from the same raw materials.

The semi-cordierite grog compositions according to the present invention contain about 4.4 to about 10.9 weight percent MgO, about 30.8 to about 35.9 weight percent $Al_2O_3$, about 54.8 to about 56.8 weight percent $SiO_2$ and about 2.0 to about 2.7 weight percent FeO. This amount of FeO provides an effective amount of iron to act as a mineralizer in the formation of the semi-cordierite grog. A preferred range of components is about 6.6 to about 7.7 weight percent MgO, about 33.3 to about 34.3 weight percent $Al_2O_3$, about 55.8 to about 56.1 weight percent $SiO_2$ and about 2.2 to about 2.4 weight percent $FeO_2$. The most preferred composition to date contains 7.6 weight percent MgO, 33.2 weight percent $Al_2O_3$, 55.6 weight percent $SiO_2$ and 2.3 weight percent FeO.

In forming the semi-cordierite grog compositions of the present invention, the hereinafter described particular raw materials are sintered, rather than fused. Fusion is a process of melting a crystalline material. When a number of materials are fused, they tend to mix together in the melt. Sintering is a process of forming an agglomeration of powders or crushed particles at temperatures below their melting point.

By sintering the hereinafter described raw materials, a highly shock resistant, low thermal expansion semi-cordierite grog is obtained. In forming the near stoichiometric cordierite bodies of the prior art from talc, clay and alumina, about 40% liquid is formed initially at the 1355° C. eutectic and the liquid content increases sharply above that temperature along the nearly flat liquidus on the $MgO-Al_2O_3-SiO_2$ equilibrium diagram. Because of the very short firing range, a body may go from porous to dense to slumped in a few degrees. Thus, even though the stoichiometric proportions of MgO, $Al_2O_3$ and $SiO_2$ are present, these sintered bodies made by prior art methods never seem to approach maximum cordierite formation unless fused.

The present invention overcomes this problem by using olivine, $(Mg, Fe)_2.SiO_4$, a solid solution of forsterite, $2MgO.SiO_2$, and fayalite, $2FeO.SiO_2$. Olivine supplies more MgO per mole of $SiO_2$ than does talc. When mixed with clay, desirable ratios of MgO, $Al_2O_3$ and $SiO_2$ may be achieved without the addition of expensive alumina.

As compared to talc, olivine seems to be a better cordierite former. Olivine is more refractory and contains about two-thirds more MgO than talc. The presence of iron from the fayalite in olivine is an asset. Although I do not wish to be bound by any particular theory, it is believed that iron may act as a mineralizer in promoting cordierite formation. The ferrous ion, $Fe^{++}$, having a radius of 0.74 Å, has a diameter about 12% larger than the diameter of the magnesium ion, $Mg^{++}$. Because the diameter of the ferrous ion is within 15% of the diameter of the magnesium ion, and carries the same charge, it may readily substitute for MgO in cordierite to form another low expansion mineral, iron cordierite, $2FeO.2Al_2O_3.5SiO_2$. By using olivine, a semi-cordierite is formed, having a composition $2(FeO, MgO).2Al_2O_3.5SiO_2$.

The semi-cordierite grog compositions formed using olivine in accordance with the present invention contain less than stoichiometric amounts of MgO. Two advantages are achieved: (1) low expansion aggregates of greater refractoriness are produced, and (2) with less liquid formed in the aggregate during sintering, the sintering temperature may be raised to a point of optimum cordierite formation without danger of fusion and slumping. Olivine from the State of Washington with a 46 weight percent MgO content (calcined basis) is one example of a suitable olivine. In addition, an olivine having a 49.7 weight percent MgO content (calcined basis) from North Carolina has been used with excellent success. A chemical analysis for a typical olivine is set forth in Table 1:

Table 1

|  | Raw (%) | Calcined (%) |
| --- | --- | --- |
| MgO | 48.77 | 49.70 |
| $Al_2O_3$ | — | — |
| $SiO_2$ | 42.32 | 42.99 |
| FeO | 6.16 | 6.69 |
| Loss on Ignition | 2.42 | — |

The olivine used to form the semi-cordierite grog should be finely divided. The particles should pass through a 70 mesh screen. Particles in the size range of about −180 to −200 mesh are sufficiently fine to react quickly and are excellent for producing the grogs of the present invention. The other raw materials should be particles smaller than about 20 mesh.

As used herein, "weight percent", "percent" and "%" mean weight percent of the various components based upon the total weight of the semi-cordierite grog composition, unless otherwise indicated or as otherwise made clear by the context (as in Table 1, where "%" refers to weight percent of the various components of the olivine).

In forming the semi-cordierite grog composition, about 8 to about 20 weight percent olivine is mixed with about 80 to about 92 weight percent of a natural mineral selected from the group consisting of kaolin, fireclay, bauxite, bentonite, aluminum silicates including pyrophyllite, sillimanite, kyanite and andalusite, diaspore, quartz and mixtures thereof, wherein the kaolin comprises at least about 75 weight percent of the natural mineral. As used herein, "natural mineral" means a naturally occurring inorganic substance containing silica, alumina or both, which may be either raw and impure as mined, or refined or calcined, or mixtures of these substances.

The natural mineral component comprises at least 75 weight percent kaolin. A chemical analysis for a typical kaolin is shown in Table 2:

Table 2

|  | Raw (%) | Calcined (%) |
|---|---|---|
| MgO | 0.03 | 0.03 |
| $Al_2O_3$ | 34.26 | 39.39 |
| $SiO_2$ | 50.58 | 58.10 |
| FeO | 1.34 | 1.34 |
| Loss on Ignition | 12.82 | — |

One embodiment of the present invention comprises mixing olivine with kaolin alone in the proportions referred to hereinbefore. Preferred proportions include mixing about 12 to about 14 weight percent olivine with about 86 to about 88 weight percent kaolin.

In another embodiment, about 1 to about 3 weight percent bentonite, a colloidal clay containing montmorillonite, $Al_2O_3.4SiO_2.H_2O$, is substituted for an equivalent weight of kaolin. Thus, the olivine is mixed with a natural mineral comprising about 97 to about 99 weight percent kaolin and about 1 to about 3 weight percent bentonite.

A further embodiment comprises mixing olivine with a natural mineral comprising about 75 to about 99 weight percent kaolin and about 1 to about 25 weight percent of the following calcined minerals: clay ($Al_2O_3.SiO_2.xH_2O$, comprising 30-47% $Al_2O_3$, balance mostly $SiO_2$), bauxite (the principal ore of aluminum containing 70 to 90% $Al_2O_3$, balance mostly $SiO_2$, $Fe_2O_3$ and $TiO_2$), diaspore ($Al_2O_3$), kyanite ($Al_2SiO_5$), mullite ($3Al_2O_3.SiO_2$); and/or the following raw minerals: kyanite, andalusite ($Al_2O.SiO_4$), sillimanite ($Al_2O.SiO_4$), pyrophyllite ($Al_2O_3.4SiO_2.H_2O$), quartz ($SiO_2$); or mixtures thereof.

The olivine-natural mineral mixture is then sintered to form the semi-cordierite grog composition. The sintering is achieved by heating the mixture a temperature of about 1330° C. to about 1390° C. The firing may be monitored easily by heating to about firing cone 13-14. A "firing cone" is a pyramid having a base and three sides made of unfired ceramic material whose composition is such that when heated at a controlled rate it will deform and fuse at a known temperature. Each numbered firing cone integrates time, rate of temperature rise and temperature. Depending on the rate of temperature rise and the length of soak (the amount of time at which a composition is held at a given temperature), firing cone 13 can represent temperatures from about 1320° C. to about 1350° C. and firing cone 14 can represent temperatures from about 1350° C. to about 1390° C.

The invention will now be described in more detail with reference to the following specific, non-limiting examples of semi-cordierite grog compositions formed by mixing raw olivine with raw kaolin in the amounts indicated in Table 3 and firing to firing cone 14, 1350° C:

Table 3

| Raw Mixes | Kaolin | A | B | C | D | E | F | G |
|---|---|---|---|---|---|---|---|---|
| Olivine | 0% | 8% | 10% | 12% | 14% | 16% | 18% | 20% |
| Kaolin | 100% | 92% | 90% | 88% | 86% | 84% | 82% | 80% |
| Composition | | | | | | | | |
| MgO | .03% | 4.44% | 5.53% | 6.61% | 7.69% | 8.75% | 9.82% | 10.88% |
| $Al_2O_3$ | 39.39 | 35.90 | 5.03 | 34.17 | 33.32 | 32.47 | 31.62 | 30.78 |
| $SiO_2$ | 58.10 | 56.76 | 56.42 | 56.09 | 55.77 | 55.44 | 55.12 | 54.79 |
| FeO | 1.54 | 1.99 | 2.11 | 2.23 | 2.33 | 2.45 | 2.56 | 2.66 |

The semi-cordierite grog compositions are prepared by feeding controlled amounts of raw olivine and kaolin to a mixer and adding a sufficient amount of water for the particular forming process employed. The ingredients are thoroughly mixed and extruded or otherwise formed into any desired shape and allowed to dry. After drying, the shapes were fired in a kiln to about firing cone 13-4. The resulting product can then be crushed and ground to the desired size range and mixed with other ingredients in a manner known to those skilled in the art to produce refractory bodies.

The thermal expansion and fusion (melting) characteristics were determined for each of the semi-cordierite grog mixes identified in Table 3. Fusion temperature is measured in terms of the Pyrometric Cone Equivalent (P.C.E.) method, well known to those skilled in the refractory art. It should be noted that the softening end points of P.C.E. and firing cones of the same number represent different temperatures, firing cones representing a lower temperature than P.C.E. cones. The expansion and fusion characteristics are set forth in Table 4:

Table 4

| | Kaolin | A | B | C | D | E | F | G |
|---|---|---|---|---|---|---|---|---|
| Reversible Thermal Expansion Coefficient | | | | | | | | |

Table 4-continued

|  | Kaolin | A | B | C | D | E | F | G |
|---|---|---|---|---|---|---|---|---|
| (cm/cm° C. × 10$^{-6}$) | 6.68 | 2.4 | 1.9 | 1.2 | 1.0 | 0.8 | 0.48 | 0.28 |
| P.C.E. 33-34 | 23 | 19-20 | 18 | 17-18 | 17 |  | 15-16 13-14 |  |
| Approximate P.C.E. Temperature (° C.) | 1752 | 1604 | 1552 | 1521 | 1518 | 1512 | 1460 | 1374 |

The sole drawing FIGURE represents a graph of percent linear thermal expansion versus temperature (°C.) of the grog mixes listed in Tables 3 and 4.

As can be seen from Table 4 and the graph, the reversible thermal expansion of kaolin is high. Kaolin was plagued by a sharp cristobalite inversion between 50° and 150° C. It also showed a substantial quartz inversion between 500° and 575° C. These sudden sharp displacive transformations are very destructive and must be minimized, eliminated or compensated for in a refractory body if it is to withstand thermal shock. The pure sintered kaolin grog would not perform well in standard refractory bodies intended for thermal shock resistance.

The addition of only 8% olivine to kaolin in mix A dropped the reversible thermal expansion of the grog about 64%, yet only 4.4% MgO was added to the body. The P.C.E. was a respectable cone 23, quartz inversion was reduced substantially and the low temperature cristobalite inversion was almost eliminated.

In mix C containing 12% olivine, the cristobalite inversion was eliminated completely. The expansion coefficient was negative below 300° C. This is of great benefit in preventing thermal shock in refractories as they cool. The advantage results from the fact that refractories generally fail in tension more than in compression. As a refractory body cools, the outside cools first. If the refractory has a positive coefficient of expansion, the outside shrinks, creating a condition of tension, while the inside is being compressed. As the outside shrinks around the compressed inside, the refractory body may crack. However, if the refractory body has a negative coefficient of expansion, the outside expands so that the external portion of the body is not in a state of tension. Thus, there is less of a tendency for the refractory body to crack.

The total expansion of mix C to 625° is 82% less than the total expansion of the kaolin to 625° C. The P.C.E. was cone 18, very suitable for use in the vast majority of applications where thermal shock resistance is a problem.

The reversible thermal expansion of mixes D-G were reduced further and the expansion coefficients became increasingly negative. The minimum expansion was achieved with mix G, containing 20% olivine. The expansion coefficient was negative to 540° C. and the P.C.E. was cone 13-14. Other mixtures were prepared having a higher olivine content, but no further reduction in expansion occurred. The addition of more olivine resulted in an undesirable reduction in refractoriness.

In addition to the natural mineral components and olivine comprising the semi-cordierite grog composition of the present invention, optional dispersants and-/or binders may be added to facilitate the formation of the grog. Dispersants reduce the amount of water necessary in forming the grog. The sulfonated wood lignates form one preferred group of additives which have excellent binding and dispersant characteristics. One example that has been used is "Polyfon T", a sodium lignosulfonate commercially available from West Virginia Pulp & Paper Company. Other suitable binders and dispersants include corn starch, and corn by-product binders, soy binders, and other additives known to those skilled in the art which are effective in an alumina-silica system.

The semi-cordierite grog compositions of the present invention can be mixed with other familiar ingredients in a manner known to those skilled in the art to produce refractory bodies having good thermal shock resistance and low coefficients of thermal expansion. The following specific, non-limiting examples illustrate how the semi-cordierite grog of the present invention may be used in forming kiln cartop blocks:

EXAMPLE 1

| Ingredient | Weight % |
|---|---|
| Semi-cordierite grog | 66.6 |
| Kaolin | 14.5 |
| Plastic Fireclay | 14.5 |
| Bentonite | 1.0 |
| Phosphoric Acid | 1.1 |
| Organic Plasticizer | 2.0 |

EXAMPLE 2

| Ingredient | Weight % |
|---|---|
| Semi-cordierite grog | 32.4 |
| Intermediate sized calcined kaolin | 16.4 |
| Pyrophyllite-Andalusite Ore (fine) | 13.7 |
| Kaolin | 28.4 |
| Plastic Fireclay | 4.6 |
| Bentonite | 2.8 |
| Phosphoric Acid | 1.1 |
| Organic Plasticizer | 0.1 |

The dry ingredients are weighed, batched and mixed. Water, phosphoric acid and plasticizer are added during mixing to form a plastic mass. The plastic mass is discharged into a pug mill, passed from the pug mill through a vacuum chamber to an extruder or other device for forming refractory bodies of the desired shape. The bodies are then dried at temperatures greater than about 175° C. to set the chemical bond. Kiln cartop blocks made from the compositions of Examples 1 and 2 need not, and preferably should not be fired before use in a kiln. Severe thermal cycle testing in the laboratory has shown these compositions to be 50 to 60% more resistant to thermal shock than standard prefired mixes.

The present invention may be embodied in other specific forms without departing from the spirit or essential attributes thereof and, accordingly, reference should be made to the appended claims, rather than to the foregoing specification as indicating the scope of the invention.

What is claimed is:

1. A method of making a semi-cordierite grog composition comprising forming a mixture comprising about 8 to about 20 weight percent olivine and about 80 to about 92 weight percent of a natural mineral selected from the group consisting of kaolin, fireclay, bauxite, bentonite, pyrophyllite, sillimanite, kyanite, andalusite, diaspore, quartz and mixtures thereof, wherein the kaolin comprises at least about 75 weight percent of the natural mineral, and sintering the mixture at a temperature of about 1330° C. to about 1390° C.

2. A method according to claim 1 wherein the natural mineral is kaolin.

3. A method according to claim 1 wherein the natural mineral comprises about 75 to about 99 weight percent kaolin and about 1 to about 25 weight percent of a compound selected from the group consisting of a calcined mineral selected from the group consisting of clay, bauxite, diaspore, kyanite, and mullite; and a raw mineral selected from the group consisting of kyanite, andalusite, sillimanite, pyrophyllite and quartz; and mixtures thereof.

4. A method according to claim 1 wherein the natural mineral comprises about 97 to about 99 weight percent kaolin and about 1 to about 3 weight percent bentonite.

5. A method according to claim 1 further comprising adding an effective amount of a dispersant into the mixture.

6. A method according to claim 5 wherein the dispersant is sodium lignosulfonate.

7. A method according to claim 1 further comprising adding a binder into the mixture.

8. A method according to claim 7 wherein the binder is selected from the group consisting of sodium lignosulfonate, corn starch and cereal binders.

9. A method according to claim 1 wherein the olivine has a particle size of about −70 mesh to about −200 mesh.

10. A method according to claim 1 further comprising drying the mixture before sintering it.

11. A method according to claim 1 wherein the mixture comprises about 12 weight percent olivine and about 88 weight percent of the natural mineral.

12. A method according to claim 11 wherein the natural mineral is kaolin.

13. A method according to claim 11 wherein the natural mineral is comprised of about 75 to about 99 weight percent kaolin and about 1 to about 25 weight percent of a mineral selected from the group consisting of a calcined mineral selected from the group consisting of clay, bauxite, diaspore, kyanite, and mullite; and a raw mineral selected from the group consisting of kyanite, andalusite, sillimanite, pyrophyllite, and quartz; and mixtures thereof.

14. A method according to claim 1 wherein the mixture comprises about 14 weight percent olivine and about 86 weight percent of the natural mineral.

15. A method according to claim 14 wherein the natural mineral is kaolin.

16. A method according to claim 14 wherein the natural mineral is comprised of about 75 to about 99 weight percent kaolin and about 1 to about 25 weight percent of a mineral selected from the group consisting of a calcined mineral selected from the group consisting of clay, bauxite, diaspore, kyanite, and mullite; and a raw mineral selected from the group consisting of kyanite, and alusite, sillimanite, pyrophyllite, and quartz; and mixtures thereof.

17. A grog composition made according to the method of claim 1.

18. A grog composition made according to the method of claim 2.

19. A grog composition made according to the method of claim 3.

20. A grog composition made according to the method of claim 4.

21. A grog composition made according to the method of claim 5.

22. A grog composition made according to the method of claim 6.

23. A grog composition made according to the method of claim 7.

24. A grog composition made according to the method of claim 8.

25. A grog composition made according to the method of claim 9.

26. A grog composition made according to the method of claim 10.

27. A grog composition made according to the method of claim 11.

28. A grog composition made according to the method of claim 12.

29. A grog composition made according to the method of claim 13.

30. A grog composition made according to the method of claim 14.

31. A grog composition made according to the method of claim 15.

32. A grog composition made according to the method of claim 16.

* * * * *